United States Patent [19]

Williams et al.

[11] 4,192,531

[45] Mar. 11, 1980

[54] TUBE-TO-PLATE CONNECTION

[75] Inventors: Ronald S. Williams; Robert S. Hill, both of Columbus, Ind.

[73] Assignee: Arvin Industries, Inc., Columbus, Ind.

[21] Appl. No.: 908,392

[22] Filed: May 22, 1978

[51] Int. Cl.² ............................................. F16L 41/00
[52] U.S. Cl. ................................... 285/222; 285/331; 285/334.5; 403/242; 403/285
[58] Field of Search .............. 403/242, 240, 244, 245, 403/284, 285; 285/222, 334.5, 331, 201, 202; 248/220.2, 188.1, 188.8; 108/153

[56] References Cited

U.S. PATENT DOCUMENTS

| 1,395,707 | 11/1921 | Grierson | 248/220.2 |
| 2,164,629 | 4/1939 | Sibley | 285/222 X |
| 3,342,366 | 9/1967 | Defauw | 285/202 X |

FOREIGN PATENT DOCUMENTS 91497 6/1959 Netherlands .............................. 285/202

*Primary Examiner*—Wayne L. Shedd
*Attorney, Agent, or Firm*—Jenkins, Coffey, Hyland, Badger & Conard

[57] ABSTRACT

A tube-to-plate connection includes a plate defining an aperture where the tube is to be attached to the plate. The portion of the plate surrounding the aperture includes a plurality of fingers extending away from the plane of the plate and projecting radially inwardly toward the axis of the aperture. The end of the tube lies generally against the radially inward projections of the fingers to prevent movement of the tube longitudinally further through the plate. The tube side wall includes a radially deformed portion adjacent each finger to prevent rotation of the tube in the plate. The fingers and the tube end include portions adjacent the radially inward projections of the fingers which are flared radially outward to prevent movement of the tube longitudinally out of engagement with the plate.

9 Claims, 9 Drawing Figures

TUBE-TO-PLATE CONNECTION

This invention relates to tube-to-plate connections, and specifically to a quick, reliable and economical tube-to-plate connection, and to a method and apparatus for forming such connection.

Tube-to-plate connections are used in many structures. One area in which such connections are of substantial importance is in the manufacture of automotive exhaust system components, such as mufflers and catalytic converters. Conventionally, such connections have been made by welding an end portion of a tube directly to the plate to which it is to be connected. Another method of forming a tube-to-plate connection includes the steps of forming a plurality of protrusions, or "nipples" in the side of a tube which is to be connected to a plate, and inserting the tube into an aperture provided in the plate until the nipples contact one surface of the plate, preventing further insertion of the tube through the aperture. Then, the portion of the tube which extends beyond the plane of the other side of the plate is formed over to prevent removal of the tube from the plate. It can be seen that this structure does not prevent rotation of the tube in the aperture. Rather, additional means, such as a single spot weld, or other structure or operation, must be provided to prevent relative rotation of the tube and plate.

Reference is here made to U.S. Pat. Nos. 3,761,116 and 3,766,631 for their showings of tube-to-plate connections. Reference is here also made to the co-pending U.S. patent application Ser. No. 908,393 of Ronald S. Williams, filed May 22, 1978, titled Tube-To-Plate Connection, and assigned to the same assignee as this invention.

It is an object of the present invention to provide a low-cost reliable tube-to-plate connection, as well as a method and apparatus for forming the connection.

According to the invention, a tube is connected to a plate about an aperture in the plate. Illustratively, the plate may define a chamber within a vehicle exhaust system component, such as a muffler, and the aperture may place the tube in open communication with the chamber. The portion of the plate surrounding the aperture includes a flange which extends away from the plane of the plate and provides a plurality of fingers. The fingers at the flange distal end project radially inwardly toward the axis of the aperture. The end of the tube which is connected to the plate lies within the flange, generally against the radially inwardly projecting finger portions to prevent movement of the tube longitudinally further into the aperture. The distal ends of the fingers are formed over into the interior of the tube end, radially deforming portions of the tube side wall outwardly. Engagement of the radially deformed portion of the tube side wall by the finger distal end portions prevents rotation of the tube with respect to the plate. The flange, fingers, and tube end include portions which are flared to prevent movement of the tube longitudinally out of engagement with the plate.

Additionally, according to the present invention, the method of joining the tube and plate comprises steps of forming the aperture in the plate where the tube is to be joined thereto, forming the flange and fingers around the perimeter of the aperture and inserting the tube into the plate. The flange includes a portion which extends generally along the side wall of the inserted tube. The method further includes the steps of forming the fingers radially inwardly and back toward the plane of the plate and deforming the tube side wall radially outwardly by contact between the tube inner side wall and the fingers and urging the fingers radially outwardly after such contact to capture the tube against rotation.

In an illustrative embodiment, the fingers are formed by providing a plurality of slots which extends longitudinally of the flange from the edge thereof remote from the plane of the plate towards the plane of the plate. The slots are formed before the flange is formed. The flange subsequently is formed by forming the plate material between adjacent slots outwardly generally perpendicularly to the plane of the plate.

According to an illustrative embodiment, the method further comprises the step of forming the fingers radially inwardly from the flange over the end of the tube to prevent movement of the tube longitudinally further into the plate.

According to an illustrative embodiment, the method further comprises the step of deforming the tube end, fingers and flange radially outwardly in a flared or campanulate configuration to prevent longitudinal movement of the tube from the aperture and minimize gas flow restriction into the end of the tube. Deforming the fingers radially outwardly causes indentations to be formed in the inner side walls of the tube around the radially outwardly deformed distal ends of the fingers. Engagement of the finger distal end portions in the indentations prevents rotation of the tube in the plate.

According to an embodiment of the invention, an apparatus for making a tube-to-plate connection includes a blanking punch for forming the aperture in the plate and for providing the fingers in the region in which the flange will be formed. This apparatus further includes dies for forming the periphery of the aperture into the flange, and for forming the fingers over to provide radially inwardly projecting finger portions, and means for holding the end of the tube to be joined to the plate against the radially inwardly projecting finger portions. The illustrative apparatus also includes a tooling punch for forming the tube side wall and finger distal end portions radially outwardly to form the indentations in the tube side wall into which the finger distal end portions engage.

The invention may best be understood by referring to the following description and accompanying drawings which illustrate the invention. In the drawings.

Figure 1:
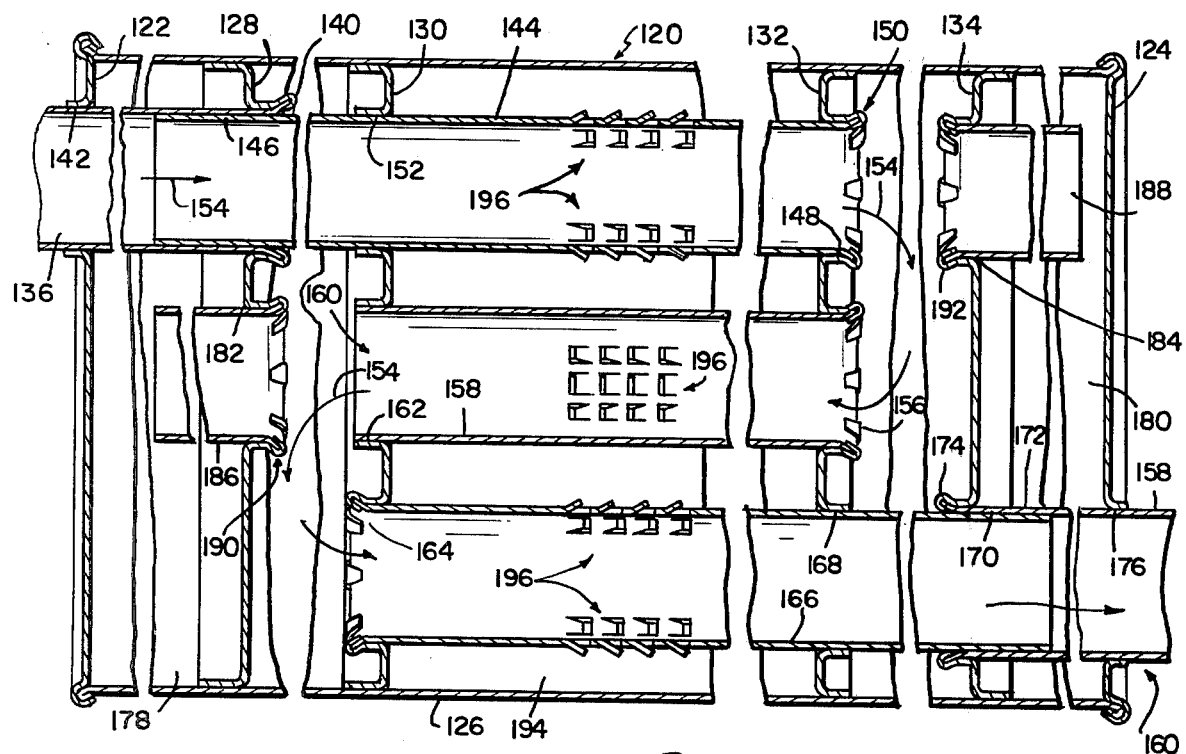
FIG. 1 is a fragmentary elevational view of a plate to which a tube is to be connected, after a preliminary step in the connection process.
Figure 1:
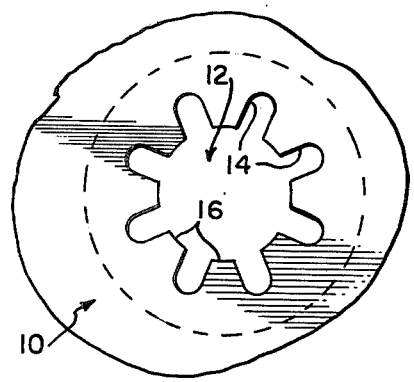
Figure 2:
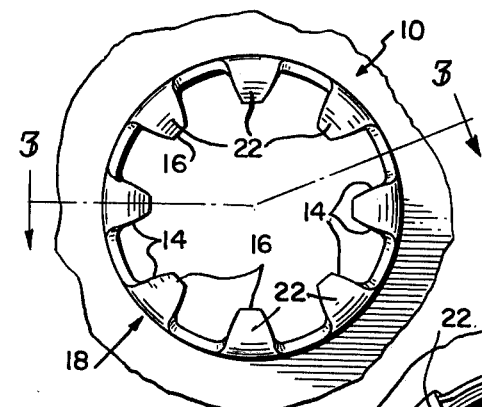
FIG. 2 is a fragmentary elevational view of the plate of FIG. 1 after a subsequent step in the connection process has been performed.

With particular reference to FIGS. 1-5, the method of the present invention will now be described. FIG. 1 shows a plate 10, which is a thin sheet of material, e.g., metal, to which a tube is to be connected. Plate 10 includes a region surrounding an aperture 12 formed in the plate with a plurality of slots 14 which extend generally radially from the center of aperture 12 and open into the peripheral edge 16 of the aperture 12. In FIG. 2, a subsequent step in the formation of a tube-to-plate connection has been performed. The sheet metal of plate 10 around the peripheral edge 16 of aperture 12 and including the entire radial extent of each of slots 14 has been formed into a shallow cup shape, as illustrated at 18. This shape 18 can also be seen in FIG. 3. From FIG. 3, it will be appreciated that the cup-shaped structure 18 includes a flange portion 20 which extends generally perpendicular to the plane defined by plate 10, and a plurality of fingers 22 surrounding the peripheral edge 16 of aperture 12. As will be appreciated, fingers 22 extend generally radially toward the center of aperture 12 as indicated at 23 and back toward the plane of plate 10 at 24 at approximately a 45° angle to the plate of plate 10.

After formation of the flange 20 and fingers 22, the end 25 of a generally right circular cylindrical tube 26 is inserted into the space 28 provided by the cup-like portions of fingers 22. In the next step of the method, best illustrated in FIGS. 4-5, the distal ends of fingers 22 are deformed radially outwardly, forcing the side wall 30 of tube end 25 to be deformed radially into a plurality of indentations 31. One such indentation is clearly shown in FIG. 4, its respective finger 22 distal end portion having been broken away. It will be appreciated that this step prevents rotation of the tube 26 with respect to the plate 10. It will further be appreciated that this step alone will prevent movement of tube 26 axially through the plate 10. However, it may be desirable to perform certain additional steps upon the tube 26, the plate 10 or both, to insure the axially stationary positioning of tube 26 in plate 10.

Figure 4:
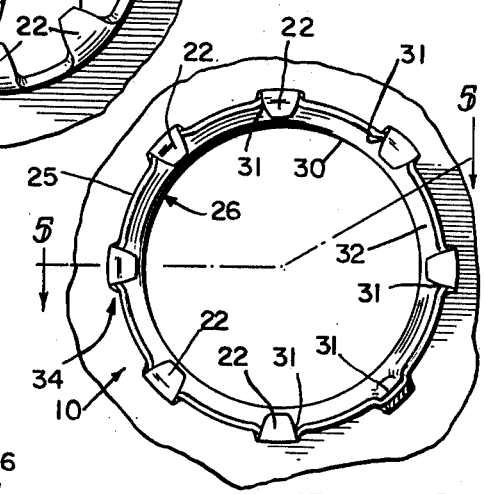
FIG. 4 is a fragmentary sectional elevational view of the tube-plate assembly after completion of the method according to the present invention.

To this end, and with reference to FIG. 4, it will be seen that side wall portion 32 of tube 26, and that fingers 22, flange 20 and tube end 25 are formed radially outwardly from the axis of aperture 12. These method steps provide a flared or companiform connection 34 of the tube 26 to plate 10. A significant advantage of this flared connection 34 will be explained.

Figure 6:
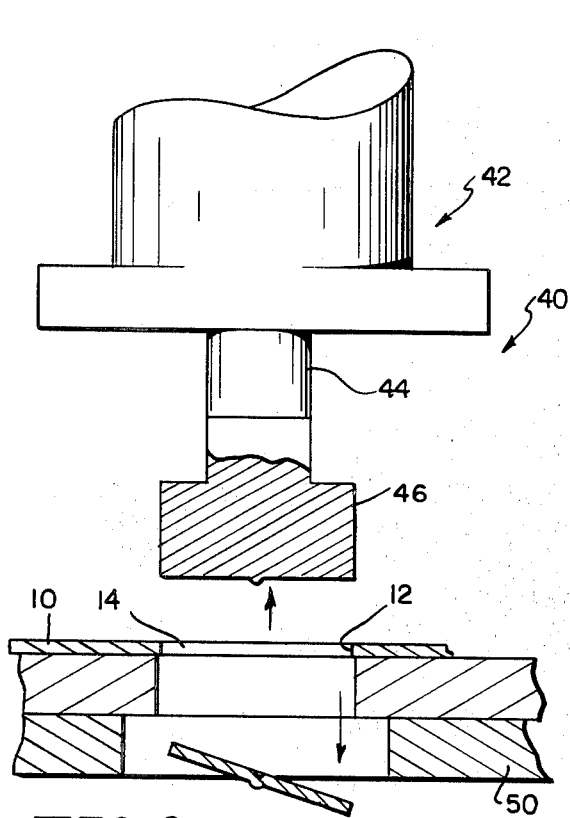
FIG. 6 is a partly sectional side elevational view of an apparatus for performing one of the forming steps, illustrated in FIG. 1, upon the plate.

Turning now to FIG. 6, an apparatus 40 for forming the aperture 12 and slots 14 in plate 10 will be discussed. The apparatus 40 includes a press 42. The press 42 includes a ram 44 and a blanking die 46. The apparatus 46 further includes a table 50 for supporting the plate 10.

Figure 3:
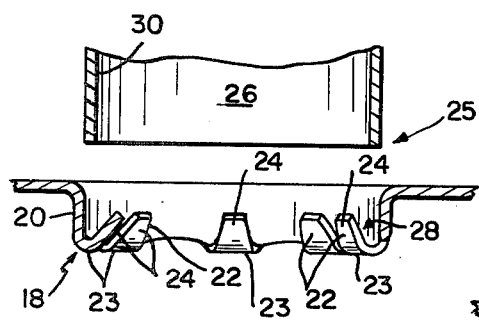
FIG. 3 is a fragmentary sectional side elevational view of the plate as shown in FIG. 2, with the tube about to be brought into engagement therewith, the section of the plate being taken generally along section lines 3—3 of FIG. 2.
Figure 5:
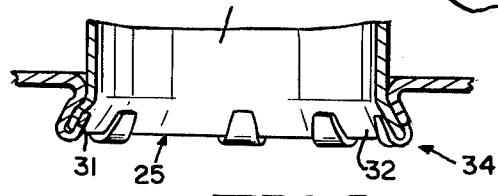
FIG. 5 is a fragmentary sectional elevational view taken generally along section lines 5—5 of FIG. 4.
Figure 7:
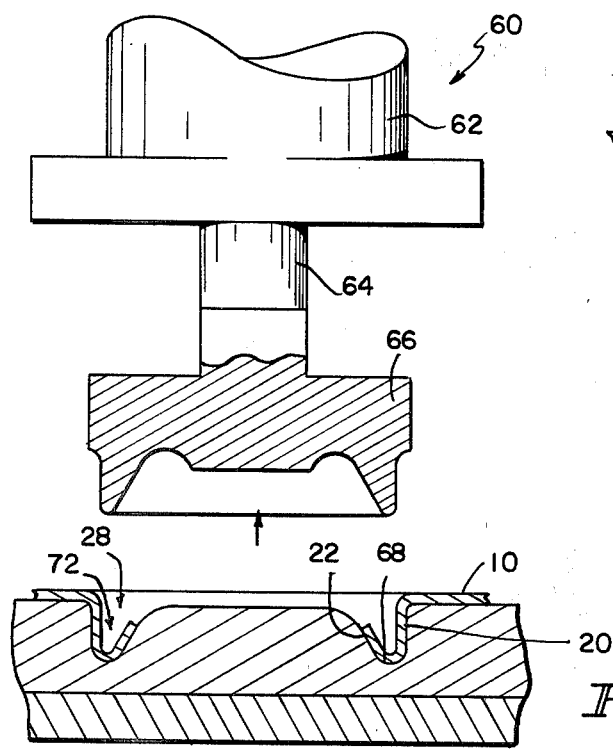
FIG. 7 is a partly sectional side elevational view of an apparatus for performing one of the forming steps, illustrated in FIG. 2, on the plate.

Referring now to FIG. 7, an apparatus 60 is provided for forming the region of plate 10 surrounding the aperture 12 and slots 14 into the configuration illustrated in FIGS. 2-3. The illustrative apparatus 60 includes a press 62 having a ram 64 and dies 66, one of the dies defining a cavity 68 for receiving the other die 66 and the portion of plate 10 surrounding aperture 12 and slots 14 which is to be formed in the apparatus 60. Apparatus 60 also includes a table 70 for properly locating the plate 10. During each stroke of the ram 64 of press 62, a region 72 surrounding the aperture 12 and slots 14 of a particular plate 10 is formed to provide the flange 20 and fingers 22 surrounding aperture 12. The dies 66 control the orientations of the flange 20 and fingers 22 and the space 28 formed therebetween.

Figure 8:
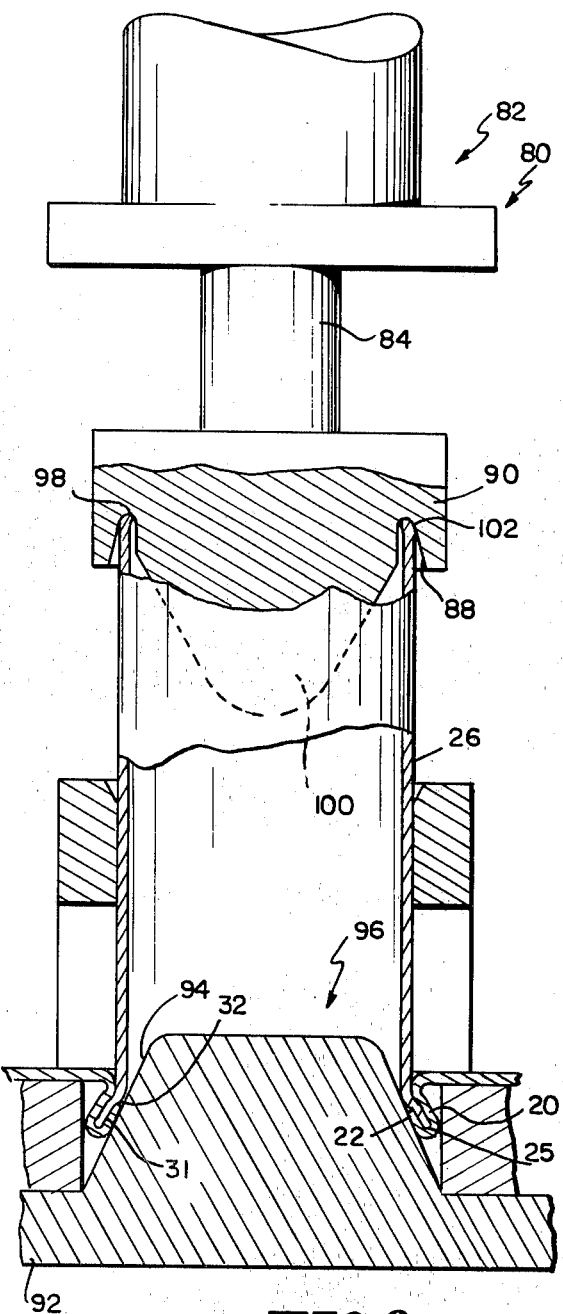
FIG. 8 is a partly sectional side elevational view of an apparatus for performing the final assembly steps, as best illustrated in FIGS. 3-5, on the tube and plate; and, FIG. 9 is a sectional top plan view of a vehicle exhaust muffler utilizing the structure of the present invention.

Referring now particularly to FIG. 8, there is illustrated a final assembly apparatus 80 including a press 82 with a ram 84 movably supporting an element 90 provided with a cavity 88. The assembly apparatus 80 includes a table 92. The region 72 surrounding the aperture 12 in plate 10 is formed in accordance with the methods and apparatus discussed in FIGS. 6-7. Then the end 25 of tube 26 is inserted into the space 28 defined between flange 20 and fingers 22 (see FIG. 3). The ram 84 executes a downward stroke, bringing the distal end portions of fingers 22 into contact with the generally frustoconical upwardly and outwardly facing surface 94 of a tooling punch 96 mounted in table 92. The upper end 98 of tube 26 is also formed by a punch 100 mounted in the ram 84 to provide a slightly inwardly directed lip 102 in preparation for subsequent assembly. It should be understood that the coincident forming of end 98 of the tube 26 may or may not be desirable.

As ram 84 continues its downward stroke after the distal end portions of fingers 22 contact surface 94, the finger distal end portions are urged radially outwardly into contact with the inner side wall portion 32 of tube 26 at the end 25. Continued downward motion of ram 84 forms the inner side wall portions 32 outwardly, providing the indentations 31 into which the distal end portions of fingers 22 fit, locking the tube 26 against rotation in the plate 10.

As ram 84 continues downward, the fingers 22, flange 20 and end 25 of tube 26 are all flared or belled slightly radially outwardly by contact between surface 94 and fingers 22. This flared or companiform tube-to-plate construction is ideally suited to use in vehicle exhaust system components. For example, and with particular reference to FIG. 9, an automotive exhaust system muffler 120 includes a pair of end plates or caps 122, 124 closing the ends of a generally right elliptical cylindrical shell 126. These elements 122, 124, 126 may be joined by any conventional technique, the joining structure shown being rolled seams. The interior of muffler 120 is divided into five resonating chambers by caps 122, 124 and internal baffle plates 128, 130, 132, 134. Communication among the various chambers within muffler 120 is provided, in part, by an inlet tube section 136 mounted in plate 128 by a tube-to-plate connection 140 made in accordance with the present invention. Tube section 136 extends through an aperture 142 in cap 122 and is sealingly secured therein, e.g., by welding. Exhaust gases which enter through inlet tube section 136 next pass through inlet tube section 144, one end 146 of which is slidingly received in tube section 136, and the other end 148 of which is connected at 150 to plate 132 by a tube-to-plate connection according to the present invention. Inlet tube section 144 is slidingly received in an aperture 152 in plate 130.

The general direction of flow from end 148 of inlet tube section 144 is as indicated by arrows 154 into the inlet end 156 of a tube section 158. The inlet end 156 of tube section 158 is fixed in plate 132 by a tube-to-plate connection according to the present invention. The outlet end 160 of tube section 158 is slidingly received in an aperture 162 in plate 130. The exhaust gas flows in the general direction of arrows 154 from the outlet end 160 of tube section 158 to the inlet end 164 of an outlet tube section 166. Again, the inlet end 164 of tube 166 is connected to plate 130 by a tube-to-plate connection constructed according to the present invention. Outlet tube section 166 extends slidingly through an aperture 168 in plate 132 and is slidingly received in an end 170 of an outlet tube section 172. Tube section 172 is connected to plate 134 by a tube-to-plate connection 174 according to the present invention. Outlet tube section 172 extends from the muffler 120 through an aperture 176 provided in end cap 124. Tube section 172 is sealingly supported in end cap 124, for example, by welding.

End resonant cavities 178, 180 are formed, respectively, between end cap 122 and plate 128 and between plate 134 and end cap 124. The throats 182, 184 of cavities 178, 180, respectively, are provided by lengths of tubing 186, 188 attached to plates 128, 134, respectively, by tube-to-plate connections 190, 192, respectively. Tube-to-plate connections 190, 192 are made in accordance with the present invention. A cavity 194 is provided between plates 130, 132. Communication with cavity 194 can be established by louver patches 196 in each of inlet tube section 144, tube section 158, and outlet tube section 172, or by additional apertures (not shown) in either or both of plates 130, 132, or by some combination of louver patches and apertures as needed.

It will be appreciated that in the illustrative muffler 120, tube-to-plate connections according to the present invention are placed at the exhuast gas entry ends of each of the tube sections within the muffler 120, the entry ends being, of course, the ends through which the exhaust gases enter the various tube sections as illustrated by arrows 154. This feature is desirable since with the tube-to-plate connection of the instant invention, a flare or bell is formed which has low-restriction flow characteristics. See, for example, tube-to-plate connections 156, 164, 190, 192.

What is claimed is:

1. A tube-to-plate connection comprising means on a plate defining an aperture where a tube is to be attached to the plate, the region of the plate surrounding the aperture including a flange for receiving the end of the tube, the flange including a proximal end at its junction with the plate and extending away from the plane of the plate to provide at its distal end a plurality of fingers, the tube including a side wall portion lying adjacent the flange, the fingers at the flange distal end being formed to include radially inwardly extending portions and finger distal end portions projecting back toward the plate, the tube end projecting into the spaces formed by the flange and fingers and contacting the radially inwardly extending finger portions, the finger distal end portions being disposed within radially inwardly opening indentations provided in the tube adjacent the tube end.

2. The tube-to-plate connection of claim 1 wherein the fingers are formed by providing a plurality of radially extending slots spaced apart about the perimeter of the aperture, the fingers being provided between the slots.

3. The tube-to-plate connection of claim 2 wherein there are eight such slots and they are substantially equally spaced about the perimeter of the aperture.

4. A tube-to-plate connection according to claim 1 wherein the flange and the tube side wall adjacent the flange are both flared radially outwardly to prevent axial movement of the tube back through the aperture.

5. A tube-to-plate connection comprising means on a plate defining an aperture where a tube is to be attached to the plate, the region of the plate surrounding the aperture including a flange for receiving the end of the tube, the flange including a proximal end at its junction with the plate and extending away from the plane of the plate to a distal end, the distal end providing a plurality of fingers, the tube including a side wall portion lying adjacent the flange, the fingers including radially extending portions and distal end portions projecting generally back toward the plate and lying radially outwardly against the tube side wall and disposed in radially outwardly projecting, radially inwardly opening indentations provided in the tube side wall, the tube end projecting into the aperture to contact the radially extending finger portions.

6. The tube-to-plate connection of claim 5 wherein the fingers are provided by a plurality of generally radially extending slots in the plate surrounding the aperture.

7. The tube-to-plate connection of claim 6 wherein there are eight such slots substantially equally spaced about the perimeter of the aperture.

8. A tube-to-plate connection according to claim 5 wherein the aperture is generally somewhat circular in shape.

9. A tube-to-plate connection according to claim 5 wherein the flange and the tube side wall adjacent the flange are both flared radially outwardly to prevent axial movement of the tube back through the aperture.

* * * * *

UNITED STATES PATENT AND TRADEMARK OFFICE
CERTIFICATE OF CORRECTION

PATENT NO. : 4,192,531

DATED : March 11, 1980

INVENTOR(S) : Ronald S. Williams and Robert S. Hill

It is certified that error appears in the above-identified patent and that said Letters Patent are hereby corrected as shown below:

Column 1, line 17, after "side" and before "of" insert -- wall --.

Column 3, line 31, "plate" (second occurrence) should be -- plane --; line 54, "companiform" should be -- campaniform --; line 60, "apparatus 46" should be -- apparatus 40 --.

Column 4, line 39, "companiform" should be -- campaniform --.

Signed and Sealed this

Twenty-second Day of July 1980

[SEAL]

Attest:

SIDNEY A. DIAMOND

Attesting Officer

Commissioner of Patents and Trademarks